United States Patent
Puusaari

(10) Patent No.: US 11,294,421 B2
(45) Date of Patent: Apr. 5, 2022

(54) PRECISION TIMING BETWEEN SYSTEMS

(71) Applicant: Nordic Semiconductor ASA, Trondheim (NO)

(72) Inventor: Kimmo Puusaari, Trondheim (NO)

(73) Assignee: Nordic Semiconductor, ASA, Trondheim (NO)

( * ) Notice: Subject to any disclaimer, the term of this patent is extended or adjusted under 35 U.S.C. 154(b) by 0 days.

(21) Appl. No.: 17/254,679

(22) PCT Filed: Jun. 24, 2019

(86) PCT No.: PCT/EP2019/066709
§ 371 (c)(1),
(2) Date: Dec. 21, 2020

(87) PCT Pub. No.: WO2020/002259
PCT Pub. Date: Jan. 2, 2020

(65) Prior Publication Data
US 2021/0149435 A1    May 20, 2021

(30) Foreign Application Priority Data
Jun. 26, 2018 (GB) .................................. 1810478

(51) Int. Cl.
*G06F 1/12*    (2006.01)
(52) U.S. Cl.
CPC ...................................... *G06F 1/12* (2013.01)
(58) Field of Classification Search
None
See application file for complete search history.

(56) References Cited

U.S. PATENT DOCUMENTS

| 6,463,494 B1 | 10/2002 | Morriss et al. |
| 2008/0072097 A1 | 3/2008 | Check et al. |
| 2009/0077264 A1* | 3/2009 | Machida ............... G06F 16/273 709/248 |

(Continued)

FOREIGN PATENT DOCUMENTS

EP    1 239 620 A2    9/2002

OTHER PUBLICATIONS

International Search Report and Written Opinion for PCT/EP2019/066709, dated Sep. 13, 2019, 14 pages.

(Continued)

*Primary Examiner* — Keshab R Pandey
(74) *Attorney, Agent, or Firm* — Klarquist Sparkman, LLP

(57) ABSTRACT

An integrated circuit system comprises first and second processing modules. The first processing module comprises a first processor, clock and memory; and the second processing module comprises a second processor, clock and memory. The first processing module sends a time-mark signal to the second processing module and stores to the first memory a first value of the first clock at which the signal was sent. The second processing module stores to the second memory a second value of the second clock at which the signal was received. The first processing module sends a command to the second processing module, wherein said command includes an execution time for a task relative to the first value. The second processing module determines the execution time for said task relative to the second value and executes said task at said execution time.

13 Claims, 2 Drawing Sheets

(56) References Cited

U.S. PATENT DOCUMENTS

| | | | |
|---|---|---|---|
| 2009/0248791 A1* | 10/2009 | Shiraki | H04L 63/12 |
| | | | 709/202 |
| 2010/0145611 A1* | 6/2010 | Tokue | G01C 21/265 |
| | | | 701/532 |
| 2012/0005516 A1 | 1/2012 | Bergmann et al. | |
| 2014/0245058 A1 | 8/2014 | Bowman et al. | |
| 2016/0191184 A1 | 6/2016 | Hsueh et al. | |
| 2016/0306900 A1* | 10/2016 | Himmler | G05B 17/02 |
| 2017/0223646 A1 | 8/2017 | Romera et al. | |
| 2018/0004244 A1* | 1/2018 | Woodhead | G06F 1/08 |
| 2018/0349255 A1* | 12/2018 | Fromme | G06F 11/22 |
| 2019/0261297 A1* | 8/2019 | Li | H04L 27/2692 |

OTHER PUBLICATIONS

IPO Search Report under Section 17(5) for GB1810478.6, dated Jan. 16, 2019, 3 pages.
Norwegian Search Report for NO 20180902, dated Nov. 21, 2018, 2 pages.

* cited by examiner

PRECISION TIMING BETWEEN SYSTEMS

CROSS REFERENCE TO RELATED APPLICATIONS

This is the U.S. National Stage of International Application No. PCT/EP2019/066709, filed Jun. 24, 2019, which was published in English under PCT Article 21(2), which in turn claims the benefit of Great Britain Application No. 1810478.6, filed Jun. 26, 2018.

This invention relates to the synchronisation of clocks within a circuit system.

Integrated circuit systems often comprise several component modules each having their own independent clock (e.g. a modem and an RF baseband processor). These clocks may be started at different times or may have a different number of bits, making it difficult to schedule tasks between different components.

In addition, clocks typically operate with a slightly different actual frequency to their nominal value (e.g. due to temperature fluctuations or manufacturing variations), causing one or more supposedly synchronised clocks to drift relative to the each other. This can cause timing errors and, again, increase the difficulty of scheduling tasks between different components.

To mitigate these issues, different clocks within a system may be synchronised. The IEEE 1588 standard defines the Precision Time Protocol (PTP), which sets out an approach by which clocks on a network may be precisely synchronised. PTP involves a "master" clock (typically the highest quality clock), to which all other "slave" clocks in the network are synchronised.

However, to achieve clock synchronisation, PTP requires two-way communication between the master and slave clocks, necessitating additional hardware and increasing power consumption. Existing alternatives to PTP require custom hardware support and/or reduce the functionality or independence of the component clocks. The present invention sets out an alternative approach.

From a first aspect, the invention provides an integrated circuit system comprising a first processing module and a second processing module, wherein:
the first processing module comprises a first processor, a first clock and a first memory; and
the second processing module comprises a second processor, a second clock and a second memory;
wherein the first processing module is configured to:
  send a time-mark signal to the second processing module; and
  store to the first memory a first value of the first clock at which the time-mark signal was sent;
wherein the second processing module is configured to:
  receive the time-mark signal from the first processing module;
  store to the second memory a second value of the second clock at which the time-mark signal was received;
wherein the first processing module is further configured to send a command to the second processing module, wherein said command includes an execution time for a task relative to the first value;
wherein the second processing module is configured to determine the execution time for said task relative to the second value and to execute said task at said execution time.

Thus it will be seen by those skilled in the art that, in accordance with the invention, precise task scheduling may be achieved using only one-way communication from the first processing module to the second processing module. Synchronising the first and second processing modules using only one-way communication reduces power consumption, reduces the number of data lines and/or bus capacity required and can be achieved using less complex hardware than that required for conventional synchronisation using two-way communication. In addition, because the second processing module is configured to store to the second memory a second value of the second clock at which the time-mark signal was received, the second clock does not need to be re-loaded at each synchronisation, reducing the complexity of the design.

The first and second clocks may have a different number of bits, in which case they may not necessarily have the same value at a given point in time. Whilst ordinarily this would complicate attempts to correctly schedule task executions, the present invention is not reliant on absolute values of the first and second clock but instead may operate independently of these values. This enables the first and second processing modules to be synchronised despite bit size differences. The second clock may comprise a fewer number of bits than the first clock (e.g. half as many bits).

Similarly, the first and second clocks may be started (or reset) at different times, which may give rise to another reason why the first and second clocks might not have the same value at a given point in time. For example, the first and second processing modules may not always be both powered (e.g. due to the second processing module being powered off at certain times to save power). As explained above, however, because the present invention is not reliant on absolute values of the first and second clock, it enables the first and second processing modules to be synchronised despite differences in clock start or reset times. The first and/or second processing module may therefore be powered on or off at certain times to save power with no impact on the ability of the integrated circuit system to schedule tasks precisely.

Previously, when a high degree of synchronisation and/or precise timing was required, it was conventional to provide a shared clock that each processing module may use to schedule and execute tasks. The Applicant has recognised however that there are situations in which providing a shared clock is either unfeasible or disadvantageous. For example, providing each module with its own clock enables multiple modules to be provided in a system without requiring a separate master clock, reducing part count and making it easier to test each module separately. In addition, each module having its own clock may reduce the amount of information which must be sent between the first and second processing modules (e.g. reducing bus traffic). The invention may provide the desired precision without needing a shared clock.

According to the Precision Time Protocol (PTP), a master clock sends time-stamped messages to the slave clocks. The present invention may remove the need for time-stamps to be sent between the processing modules, reducing the bandwidth and power required to achieve synchronisation. The time-mark signal sent from the first to the second processing module may comprise a simple non time-stamped signal, reducing data bandwidth and power requirements.

The first and second processing modules may communicate via a bus.

In preferred embodiments, the first processing module calculates the execution time relative to the first value by calculating a difference between the first value of the first clock and a desired execution time for the task. The desired execution time may be generated by the first processing module (i.e. the first processing module may schedule the task) or may be passed to it from a further component of the integrated circuit system (e.g. a user input module), or indeed from an external source. In such embodiments the required processing abilities of the second module may be reduced, as the first processing module handles processor-intensive scheduling responsibilities while the second processing module may only need to perform simple additive functions to achieve synchronisation.

The first and/or second clock may experience different levels of timing drift. In some embodiments the drift is small (i.e. negligible), so a synchronisation of the first and second processing modules may be valid for a long period of time (i.e. execution times calculated by the second processing module relative to a given time-mark signal may remain accurate for a long period of time). In such embodiments the first processing module may be further configured to send one or more (e.g. several) further commands to the second processing module, wherein said further commands comprise execution times for further tasks relative to the first value and the second processing module may be configured to determine respective execution times for each of the further tasks relative to the second value and to execute said tasks at said respective execution times.

If frequency drift experienced by the first and/or second clock is higher, over time the synchronisation of the first and second processing modules may become less precise (i.e. the execution times calculated by the second processing module relative to a given time-mark signal may no longer be accurate). In such embodiments the first processing module may be configured to send further time-mark signals to the second processing module to re-synchronise the first and second processing modules.

The frequency with which further time-mark signals are sent may be fixed (e.g. a fixed time between signals or a fixed number of task commands) or it may be adjusted dynamically based upon a detected level of synchronisation between the first and second processing modules. For example, a time-mark signal may be sent every time the synchronisation drops below a threshold precision. The level of synchronisation between the first or second processing modules may be detected by either of the first or second processing modules or by a further module that may be dedicated to monitoring the timing of executed tasks. For example, the first processing module may monitor a bus to detect a task's execution at a certain time and compare this to the time at which it was scheduled to occur to detect a level of synchronisation between the first or second processing modules.

The detected level of synchronisation between the first and second processing modules may, in some embodiments, be used to correct the timing of task executions, without requiring re-synchronisation by sending a further time-mark signal. In some embodiments the first processing module may be configured to compensate for a detected level of synchronisation by adjusting the execution time sent to the second processing module accordingly. For example, the first processing module may detect that the second processing module has executed a task 1 ms early. The first processing module may then compensate for this timing error by adjusting a subsequent command such that the execution time for a task relative to the first value is 1 ms later than it would otherwise be. The second processing module then proceeds to execute this task at what it believes to be the later time but which is in fact the correct time according to the first processing module. It will be understood that this approach is equally applicable to cases in which the timing of the second processing module is incorrect in the other direction (i.e. tasks are executed late).

Avoiding, or reducing the frequency of, further time-mark signals reduces power use and required bandwidth.

Because the second processing module stores the second value, rather than merely resetting the second clock (i.e. setting it to zero), internal and/or other scheduling operations performed by/using the second processing module are not affected.

It may be seen that, in accordance with the invention, the first processing module is acting as a master, and the second processing module as a slave. In some embodiments the first clock is of a higher quality than the second clock, such that it is less likely to drift over time. In such cases, because task scheduling is performed by the first processing module (and then transmitted to the second), using a more accurate clock results in more accurate operation of the entire integrated circuit system. It will however be understood that the invention is beneficial even in embodiments where the clocks are of substantially equal quality or even when the first clock is of lower quality than the second clock.

The Applicant has appreciated that in some embodiments of the present invention there may be a non-negligible propagation delay introduced to the time-mark signal sent between the first and second processing modules. In some embodiments, therefore, the second processing module is configured to compensate for this propagation delay by adjusting the second value of the second clock which is stored to the second memory in response to the time-mark signal. For example, the second processing module may be configured to take a constant expected propagation time away from the second value when it is stored, ensuring that future tasks are executed at the correct time.

The first processing module and the second processing module may comprise first and second cores of a single central processing unit (CPU).

The invention extends to a method of executing tasks using a first processing module and a second processing module, the first processing module comprising a first processor, a first clock and a first memory and the second processing module comprising a second processor, a second clock and a second memory;

wherein the method comprises:
the first processing module sending a time-mark signal to the second processing module;
the first processing module storing to the first memory a first value of the first clock at which the time-mark signal was sent;
the second processing module receiving the time-mark signal from the first processing module;
the second processing module storing to the second memory a second value of
the second clock at which the time-mark signal was received;
the first processing module subsequently sending a command to the second processing module, wherein said command includes an execution time for a task relative to the first value; and
the second processing module determining the execution time for said task relative to the second value and executing said task at said execution time.

The method may comprise further steps in accordance with any of the preferential device features set out hereinabove.

Features of any embodiment described herein may, wherever appropriate, be applied to any other embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
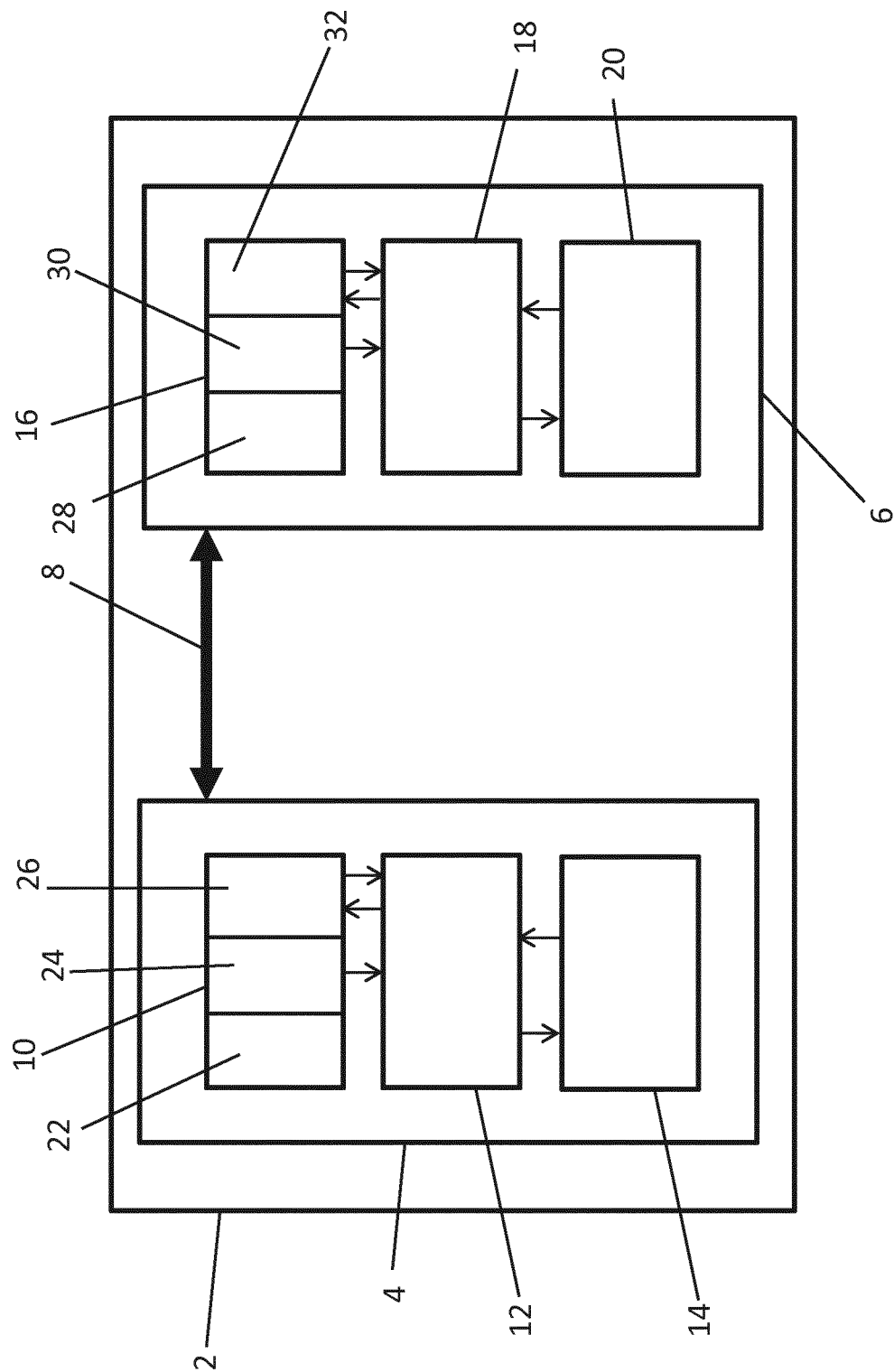
FIG. 1 is a schematic diagram of a system on a chip (SoC) according to an embodiment of the present invention.

FIG. 1 shows a system on a chip (SoC) 2 which comprises a modem 4 and a radio frequency (RF) module 6 connected via a communication bus 8. The modem 4 comprises a first clock 10, a first processor 12 and a first memory 14. The RF module 6 comprises a second clock 16, a second processor 18 and a second memory 20. The modem 4 and the RF module 6 also comprise additional components, but these are omitted from FIG. 1 for clarity.

The first clock 10 comprises a first timer 22, a first counter 24 and a compare register 26. The first counter 24 is incremented by one for each tick of the timer 22. The second clock 16 comprises a second timer 28, a second counter 30 and a second compare register 32. As an example, the second counter 24 is incremented by one for each tick of the second timer 28. The first counter 24 comprises a 64-bit counter and the second counter 30 comprises a 32-bit counter. In this embodiment the first and second timers 22, 28 operate with the same frequency, however this is not essential. Because the first counter 24 and the second counter 30 have different sizes, even if they are started simultaneously they will not necessarily have the same value at a given point in time.

The operation of the SoC 2 described above will now be described in more detail with reference to the timing diagram shown in FIG. 2.

At an initial time $t_i$, the first processor 12 programs a time $t_{a,0}$ into the compare register 26 of the first clock 10, corresponding to the value of the first counter 24 at a later actual time $t_{ii}$. The time $t_{a,0}$ is also stored to the first memory 14.

At time $t_{ii}$, the first counter 24 of the first clock 10 is at a value $t_{a,0}$, and the second counter 30 of the second clock 16 is at a value $t_{b,0}$. The compare register 26 is triggered, and a time-mark signal m is sent over the bus 8 to the RF module 6. The time-mark signal m causes the second clock 16 to save the current value of the second counter 30, $t_{b,0}$, to the second memory 20.

As part of the on-going operation of the SoC 2, a first task, e.g. transmission of a first packet, needs to be executed by the RF module 6 at a time $t_{iv}$, when the first counter 24 is at a value $t_{a,1}$. In order to schedule this task correctly the first processor 12, at a time $t_{iii}$ which is prior to $t_{iv}$, calculates the difference between this execution time $t_{a,1}$ and the time corresponding to the time $t_{ii}$, $t_{a,0}$:

$$t_1 = t_{a,1} - t_{a,0}.$$

The first processor 12 then sends a command including this relative time $t_1$ over the bus 8 to the RF module 6. This command may further include information relating to the first task (e.g. a control sequence identifier or explicit instructions including the relevant control sequence), although this is not essential.

The second processor 18, upon receipt of this command, calculates the value of the second counter 30 corresponding to the time at which the first task needs to be executed, $t_{b,1}$:

$$t_{b,1} = t_{b,0} + t_1$$

This value, $t_{b,1}$, is stored to the second compare register 32, arming the second clock 16 to trigger at the execution time. At $t_{iv}$, when the second counter 30 reaches $t_{b,1}$, the second processor 18 is triggered by the second clock 16 and the first task is executed (e.g. by writing the corresponding control sequence to hardware) at the correct time.

By using times relative to the time-mark signal m, the RF module 6 requires no knowledge of the actual scheduled time $t_{iv}$ and needs only to perform simple arithmetic operations to successfully schedule and execute the first task. In addition, only one-way communication from the modem 4 to the RF module 6 is required.

As operation of the SoC 2 continues, a second task, e.g. transmission of a second packet, needs to be executed by the second processor 18 at a time $t_{vi}$, when the first clock 10 is at a value $t_{a,2}$. A short time before $t_{vi}$ therefore, at time $t_v$, the first processor 12 calculates the difference between this execution time $t_{a,2}$ and the time corresponding to the time $t_{ii}$, $t_{a,0}$:

$$t_2 = t_{a,2} - t_{a,0}.$$

As when scheduling the first task, the first processor 12 then sends a command comprising this relative time $t_2$ over the bus 8 to the RF module 6. The second processor 16, upon receipt of this command, calculates the value $t_{b,2}$ of the second counter 30 corresponding to the time $t_v$ at which the first task needs to be executed:

$$t_{b,2} = t_{b,0} + t_2$$

This value, $t_{b,2}$, is stored to the second compare register 32, arming the second clock 16 to trigger at the execution time. When the second counter 30 reaches $t_{b,2}$, the second processor 18 is triggered by the second clock 16 and the second task is executed.

Figure 2:
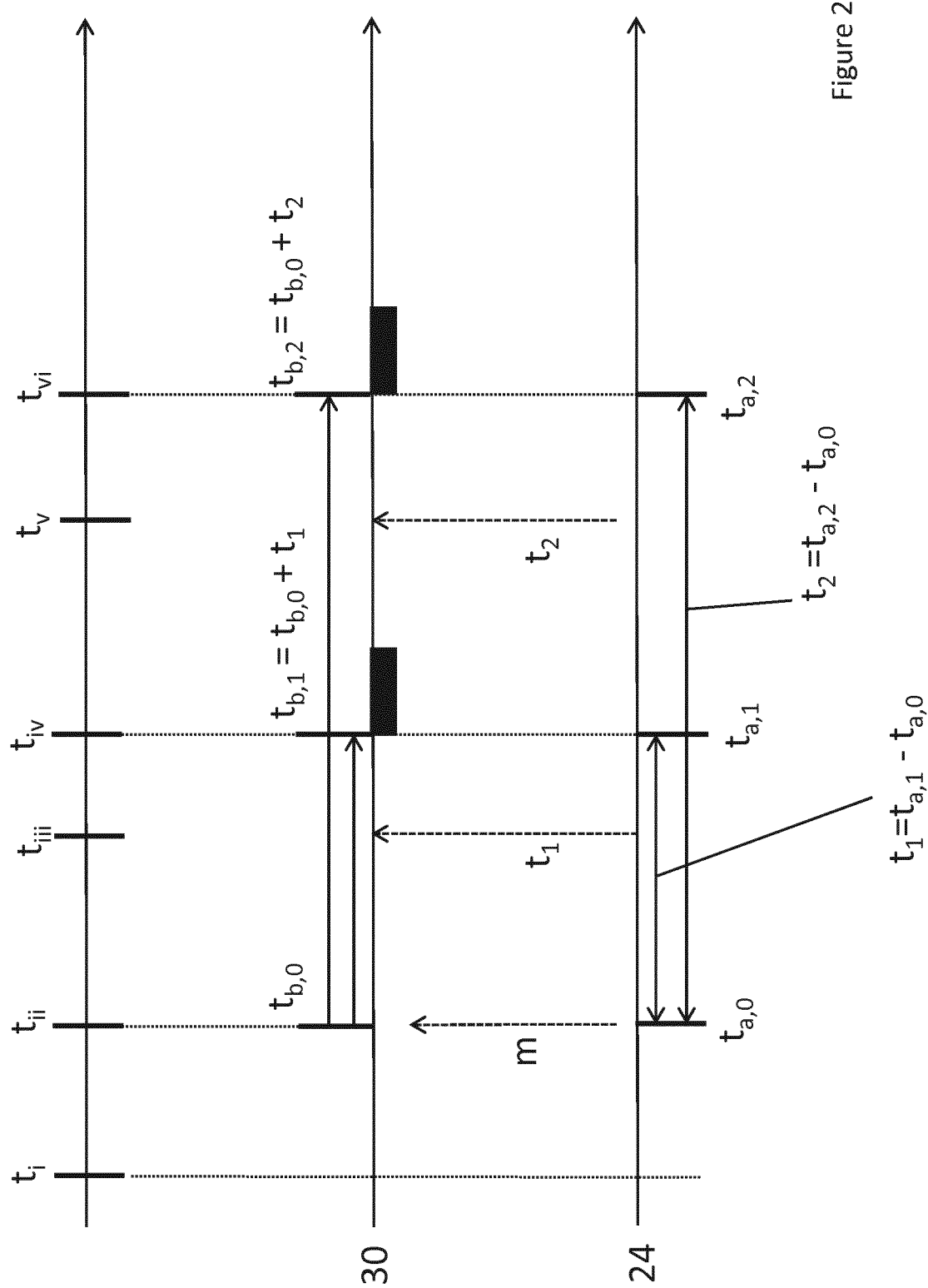
FIG. 2 is a timing diagram illustrating operation of the system on a chip of FIG. 1.

Although not shown in FIG. 2, further tasks may continue to be scheduled and executed as required. At a later time, it may become necessary to re-synchronise the modem 4 and the RF module 6. This may be achieved by repeating the time-mark procedure described above.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated circuit system comprising a first processing module and a second processing module, wherein:
   the first processing module comprises a first processor, a first clock and a first memory; and
   the second processing module comprises a second processor, a second clock and a second memory;
   wherein the first processing module is configured to:
   send a time-mark signal to the second processing module; and
   store to the first memory a first value of the first clock at which the time-mark signal was sent;
   wherein the second processing module is configured to:
   receive the time-mark signal from the first processing module;
   store to the second memory a second value of the second clock at which the time-mark signal was received;
   wherein the first processing module is further configured to
   send a command to the second processing module, wherein said command includes an execution time for a task relative to the first value;

wherein the second processing module is configured to determine the execution time for said task relative to the second value and to execute said task at said execution time.

2. The integrated circuit system as claimed in claim 1, wherein the first and second clocks have a different number of bits.

3. The integrated circuit system as claimed in claim 2, wherein the second clock comprises a fewer number of bits than the first clock.

4. The integrated circuit system as claimed in claim 1, wherein the time-mark signal sent from the first to the second processing module is not time-stamped.

5. The integrated circuit system as claimed in claim 1, wherein the first processing module is configured to calculate the execution time relative to the first value by calculating a difference between the first value of the first clock and a desired execution time for the task.

6. The integrated circuit system as claimed in claim 1, wherein the first processing module is further configured to send one or more further commands to the second processing module, wherein said further commands comprise execution times for further tasks relative to the first value, and the second processing module is configured to determine respective execution times for each of the further tasks relative to the second value and to execute said tasks at said respective execution times.

7. The integrated circuit system as claimed in claim 1, wherein the first processing module is configured to send at least one further time-mark signal to the second processing module to re-synchronise the first and second processing modules.

8. The integrated circuit system as claimed in claim 1, wherein the first processing module is configured to send a plurality of further time-mark signals at a fixed frequency.

9. The integrated circuit system as claimed in claim 1, wherein the first processing module is configured to send a plurality of further time-mark signals at a frequency which is adjusted dynamically based upon a detected level of synchronisation between the first and second processing modules.

10. The integrated circuit system as claimed in claim 1, further configured to detect a level of synchronisation between the first and second processing modules and use the detected level of synchronisation to correct timing of task executions.

11. The integrated circuit system as claimed in claim 10, wherein the first processing module is configured to compensate for a detected level of synchronisation by adjusting the execution time sent to the second processing module.

12. The integrated circuit system as claimed in claim 1, wherein the first processing module and the second processing module comprise first and second cores of a single central processing unit (CPU).

13. A method of executing tasks using a first processing module and a second processing module, the first processing module comprising a first processor, a first clock and a first memory and the second processing module comprising a second processor, a second clock and a second memory;
wherein the method comprises:
the first processing module sending a time-mark signal to the second processing module;
the first processing module storing to the first memory a first value of the first clock at which the time-mark signal was sent;
the second processing module receiving the time-mark signal from the first processing module;
the second processing module storing to the second memory a second value of the second clock at which the time-mark signal was received;
the first processing module subsequently sending a command to the second processing module, wherein said command includes an execution time for a task relative to the first value; and
the second processing module determining the execution time for said task relative to the second value and executing said task at said execution time.

* * * * *